(12) United States Patent
Tong et al.

(10) Patent No.: US 11,233,395 B2
(45) Date of Patent: Jan. 25, 2022

(54) DYNAMIC THUNDER AND LIGHTNING PROTECTION METHOD AND SYSTEM

(71) Applicants: STATE GRID JIANGSU ELECTRIC POWER CO., LTD SUZHOU BRANCH, Jiangsu (CN); STATE GRID JIANGSU ELECTRIC POWER CO., LTD, Jiangsu (CN); STATE GRID CORPORATION OF CHINA, Beijing (CN)

(72) Inventors: Chong Tong, Suzhou (CN); Yunfeng Cai, Suzhou (CN); Ziyang Zhang, Nanjing (CN); Qing Wang, Beijing (CN); Kang Dai, Suzhou (CN); Wei Yin, Suzhou (CN)

(73) Assignees: STATE GRID JIANGSU ELECTRIC POWER CO., LTD SUZHOU, Jiangsu (CN); STATE GRID JIANGSU ELECTRIC POWER CO., LTD, Jiangsu (CN); STATE GRID CORPORATION OF CHINA, Xicheng District (CN)

( * ) Notice: Subject to any disclaimer, the term of this patent is extended or adjusted under 35 U.S.C. 154(b) by 187 days.

(21) Appl. No.: 16/485,144

(22) PCT Filed: Jul. 13, 2018

(86) PCT No.: PCT/CN2018/095659
§ 371 (c)(1),
(2) Date: Aug. 9, 2019

(87) PCT Pub. No.: WO2019/011334
PCT Pub. Date: Jan. 17, 2019

(65) Prior Publication Data
US 2020/0059093 A1    Feb. 20, 2020

(30) Foreign Application Priority Data

Jul. 13, 2017  (CN) .......................... 201710569377.2

(51) Int. Cl.
*H02J 3/00* (2006.01)
*G05B 19/048* (2006.01)

(52) U.S. Cl.
CPC .............. *H02J 3/00* (2013.01); *G05B 19/048* (2013.01); *G05B 2219/21154* (2013.01); *H02J 3/001* (2020.01)

(58) Field of Classification Search
CPC .......... H02J 3/00; H02J 3/001; H02J 13/0004; H02J 3/0012; G05B 19/048;
(Continued)

(56) References Cited

U.S. PATENT DOCUMENTS

| 7,272,516 | B2* | 9/2007 | Wang ........................ H02J 3/00 702/60 |
| 2008/0077336 | A1* | 3/2008 | Fernandes ................ H04Q 9/04 702/57 |

(Continued)

FOREIGN PATENT DOCUMENTS

| CN | 103927435 A | 7/2014 |
| CN | 104008512 A | 8/2014 |

(Continued)

OTHER PUBLICATIONS

International Search Report for PCT/CN2018/095659 dated Sep. 5, 2018 with English Translation.

*Primary Examiner* — Ziaul Karim
(74) *Attorney, Agent, or Firm* — Arent Fox LLP

(57) ABSTRACT

Disclosed are a dynamic lightning protection method and system. The method includes detecting lightning in real time and tracking a position of a thunderstorm; and performing dynamic lightning protection and control on an electrical
(Continued)

grid according to an electrical grid control strategy before the thunderstorm reaches or affects the electrical grid. Further disclosed is a dynamic lightning protection system.

15 Claims, 6 Drawing Sheets

(58) Field of Classification Search
CPC .......... G05B 2219/21154; Y02B 90/20; Y02E 40/70; Y04S 20/00; Y04S 10/50
See application file for complete search history.

(56) References Cited

U.S. PATENT DOCUMENTS

| | | | | |
|---|---|---|---|---|
| 2008/0172312 | A1* | 7/2008 | Synesiou | G06Q 50/06 705/34 |
| 2010/0328314 | A1* | 12/2010 | Ellingham | G06Q 30/02 345/440 |
| 2012/0286770 | A1* | 11/2012 | Schroder | H05B 47/19 324/113 |
| 2015/0198355 | A1* | 7/2015 | Huang | F24D 17/0021 126/652 |
| 2015/0316944 | A1* | 11/2015 | Thellend | H02J 13/00001 700/292 |

FOREIGN PATENT DOCUMENTS

| | | | | |
|---|---|---|---|---|
| CN | 106410792 | A * | 10/2016 | ................ H02J 3/00 |
| CN | 106410792 | A | 2/2017 | |
| CN | 107453352 | A | 12/2017 | |

\* cited by examiner

DYNAMIC THUNDER AND LIGHTNING PROTECTION METHOD AND SYSTEM

CROSS-REFERENCE TO RELATED APPLICATIONS

This application is a US national phase application of international patent application No. PCT/CN2018/095659 filed on Jul. 13, 2018, which claims priority to Chinese patent application No. 201710569377.2 filed on Jul. 13, 2017, the disclosures of which are incorporated herein by reference in their entirety.

TECHNICAL FIELD

The present application relates to the field of lightning protection, and, for example, relates to a dynamic lightning protection method and system.

BACKGROUND

Lightning is always a major factor that jeopardizes the safety of electrical grids. More than a half of the electrical grid accidents in the coastal areas of China are caused by lightning. Traditional lightning protection technologies can minimize lightning damage but cannot eliminate it completely. This is also a worldwide problem.

In recent years, the global climate has changed obviously, and the frequent extreme weather has made the lightning activities become more intense. According to a research published by international authorities, global thunderstorm activities will continue to increase substantially in the foreseeable future decades.

With the development of power systems, lightning has always been a major natural factor that jeopardizes the safety of electrical grids and causes power outages in a certain region. Each year, more than 30% power outages in the US and more than 50% power outages in Europe are caused by lightning. More than half of the electrical grid accidents in the coastal areas of China are caused by lightning. With the construction and development of smart electrical grids, various challenges will come out, including the access of a large quantity of new energy, the transmission of large-scale cross-regional electrical energy, and the increasing complexity. In an extreme condition, the lightning may still trigger electrical grid cascading accidents, causing the power outages in local or larger area.

In traditional lightning protection mode, the protected target is a single device or installation such as transmission lines, transformers, electronic devices, substations, and so on. Relatively fixed protection measures are used, such as overhead ground wires, lightning rods, lightning arresters, and surge protection device, etc. Its main principle is to introduce the destructive energy of lightning into earth or improve the protection level and insulation strength. The focus lies on the designing and installation stage.

Analysis of common lightning protection technologies for electrical grids is as follows:

(1) Lightning Rods and Overhead Ground Wires:

In principle, the lightning rods or the ground wires guide the lightning stroke that occurs near the protected target to themselves and then introduce the energy generated by the lightning stroke into the earth, thereby protecting the protected target from the direct lightning stroke. However, referring to relevant international standards like IEEE Std 1243-1997 and IEEE Std 1313.2-1999 (R2005), etc., it can be found that when this method is adopted, two situations, namely "shielding failure" and "back flashover", can still cause lightning damage.

"Shielding failure" means that the direct lightning flash gets around the lightning rod or the overhead ground wire to directly strike the protected target such as a transmission line. A large number of studies have shown that an incidence rate of shielding failure increases in complex terrain. Additionally, one direct lightning flash usually includes 3 to 5 return strokes (in which the first is called the first stroke and the rest are called subsequent return strokes). Protection is usually effective to the first stroke and ineffective to the subsequent return strokes, which makes the subsequent lightning discharge directly strikes on the protected target. Optimizing the protective angle of the ground wire can reduce the incidence rate of shielding failure. However, due to the limitations of the tower height and construction conditions, the preceding situation cannot be avoided in reality.

"Back flashover" means that, when the direct lightning flash occurs on the lightning rod or the overhead ground wire, high potential is generated at the grounding point since energy cannot be released in time, which causes flashover occurred between the ground wire and the phase line or damage on the related protected target due to the increase of ground potential. According to relevant international standards CEI/IEC 60826:2003 and IEEE Std 1313.2-1999 (R2005), an incidence rate of Back Flashover is closely related to a ground resistance. However, on some terrain such as mountain land, it is difficult to effectively reduce the ground resistance for a long term due to the limitation of soil resistance. As the electrical grid is usually featured by a long distance and a wide span and is deployed on various terrain, it is impossible to effectively ensure that the ground resistances of the towers can reach a safe value.

(2) Insulation Level

Increasing the insulation level of the power line can improve the lightning protection performance correspondingly. According to relevant IEC international insulation coordination standard IEC 60071-2:1996 and IEEE international standard Std 1313.2-1999 (R2005), the insulation level of the power line cannot be increased without limit and should be set within a relatively reasonable range based on reasonable and economical design and construction principles, and actual construction, maintenance restrictions, as well as overall consideration of switching overvoltage, pollution flashover, should also be considered. According to relevant international standards, it is impossible to reasonably and economically maximize the insulation levels of all power lines in actual operation of the electrical grid. The lightning stroke in nature has a strong randomness and in many cases exceeds the insulation level of the line.

(3) Lightning Arrester

The arrester is in principle a surge protection device. The installation of a lightning arrester on the phase line of the power line can effectively limit the transient overvoltage. For the sake of principle, the lightning arrester itself has a leakage current and thereby must be monitored and maintained for long terms. It is not reasonable or economical to install arresters on each tower and phase line, and if so, heavy maintenance work will be generated in the later stage. Additionally, according to international standards such as IEEE Std 1243-1997, factors such as failure or malfunction of the arrester must also be taken into account.

Since millions of devices are in the entire electrical grid, it is difficult to ensure that the lightning protection performance of each device and each component is in an optimal state due to the huge base. Meanwhile, according to reasonable and economical construction principles, it is difficult to ensure that the lightning protection performance of each line and each component can be maximized. The electrical grid is huge in scale so that the number of small probability events is still considerable. The traditional lightning protection technologies can minimize lightning damages but it is difficult to eliminate them completely. In the actual operation, a large number of power outages caused by lightning strokes still occur in the electrical grid and cannot be solved by the traditional lightning protection technologies.

SUMMARY

The following is a summary of the subject matter described herein in detail. This summary is not intended to limit the scope of the claims.

The present application provides a dynamic lightning protection method and system.

Embodiments of the present application provide a dynamic lightning protection method. The method includes detecting lightning in real time and tracking the position of the thunderstorm; and performing dynamic lightning protection and control on an electrical grid according to an electrical grid control strategy before the thunderstorm reaches or affects the electrical grid.

The electrical grid control strategy includes at least one of the following: optimizing the operation mode of the electrical grid to change the power flow path of the electrical grid to prevent power flows of the electrical grid from passing through the lightning-threatened area; adjusting power flows of the electrical grid to reduce power flows on the power transmission path in the lightning-threatened area and increase power flows on the power transmission path in safe areas; or non-linearly controlling the generator/power generation unit and dynamically controlling the power source to control the power flow output of the electrical grid and increase the power output in the safe area.

In one embodiment, the stability of the power grid caused by the grid control strategy should be estimated before the dynamic lightning protection and control is carried out.

In one embodiment, the stability of the power grid after the grid control strategy is carried out should be estimated using wide-area state estimation and a stability boundary calculation. And the grid will be controlled if the power grid is determined as stable after the grid is carried out.

In one embodiment, the position of the thunderstorm is tracked according to acquired real-time lightning direction data and atmospheric electric field strength information.

In one embodiment, the electrical grid is partitioned and an early-warning level of each partition of the electrical grid is determined respectively according to the position of the thunderstorm after the partitioning; or the electrical grid is layered and an early-warning level of each layer of the electrical grid is determined respectively according to the position of the thunderstorm after the layering.

Embodiments of the present application further provide a dynamic lightning protection system. The system includes a real-time lightning tracking unit, a data processing center, an operation mode control module, a power flow optimization and adjustment module, and a generator/power generation unit nonlinear control module.

The real-time lightning tracking unit is configured to track the position of the thunderstorm according to real-time lightning direction data and atmospheric electric field strength information.

The data processing center is configured to acquire real-time lightning tracking information from the real-time lightning tracking unit, geographic distribution information of the electrical grid from the geographic information system, and operation mode information of the electrical grid and power flow distribution information and real-time load information of the electrical grid from the electric energy management system/wide-area measurement system. All information which serves as a basic data element will be inputted into each module, and feedback information of each module will be received, and the data processing center will then transmit the feedback information to corresponding modules.

The operation mode control module is configured to optimize the operation mode of the electrical grid before the thunderstorm reaches or affects the electrical grid to change the power flow path of the electrical grid to prevent power flows of the electrical grid from passing through the lightning-threatened area.

The power flow optimization and adjustment module is configured to adjust power flows of the electrical grid before the thunderstorm reaches or affects the electrical grid to reduce power flows on the power transmission path in the lightning-threatened area and increase power flows on the power transmission path in the safe area.

The generator/power generation unit nonlinear control module is configured to non-linearly control the generator/power generation unit and dynamically control the power source before the thunderstorm reaches or affects the electrical grid to control the power flow output of the electrical grid and increase the power output in the safe area.

In one embodiment, the system further includes the scheduling base class library, the state estimation module and the stability calculation module.

The scheduling base class library is configured to store electrical grid stability constraint verification rules.

The state estimation module is configured to perform a wide-area state estimation on the electrical grid after the electrical grid is controlled according to an electrical grid control strategy, and determine whether the controlled electrical grid is stable according to the electrical grid stability constraint verification rules.

The stability calculation module is configured to perform a stability boundary calculation for the electrical grid after the electrical grid is controlled according to the electrical grid control strategy, and determine whether the controlled electrical grid is stable according to the electrical grid stability constraint verification rules.

In one embodiment, the data processing center is further configured to acquire equipment lightning protection performance information, equipment status and defect information from the Management Information System (MIS) of the electrical grid.

In one embodiment, the dynamic lightning protection system further includes the electrical grid partitioning and early-warning module. The electrical grid partitioning and early-warning module is configured to partition the electrical grid and determine an early-warning level of each partition of the electrical grid according to the position of the thunderstorm after the partitioning. The dynamic lightning protection system further includes an electrical grid layering and early-warning module configured to layer the electrical grid and determine an early-warning level of each layer of the electrical grid respectively according to the position of the thunderstorm after the layering.

Embodiments of the present application further provide a computer-readable storage medium storing a computer program, which is used to perform the preceding dynamic lightning protection method when executed by a processor. Other aspects can be understood after the accompanying drawings and detailed description are read and understood.

DETAILED DESCRIPTION

The present application will be further described below in detail with reference to the accompanying drawings. The following embodiments are merely intended to illustrate the technical solutions of the present application more clearly but not to limit the protection scope of the present application.

Figure 1:
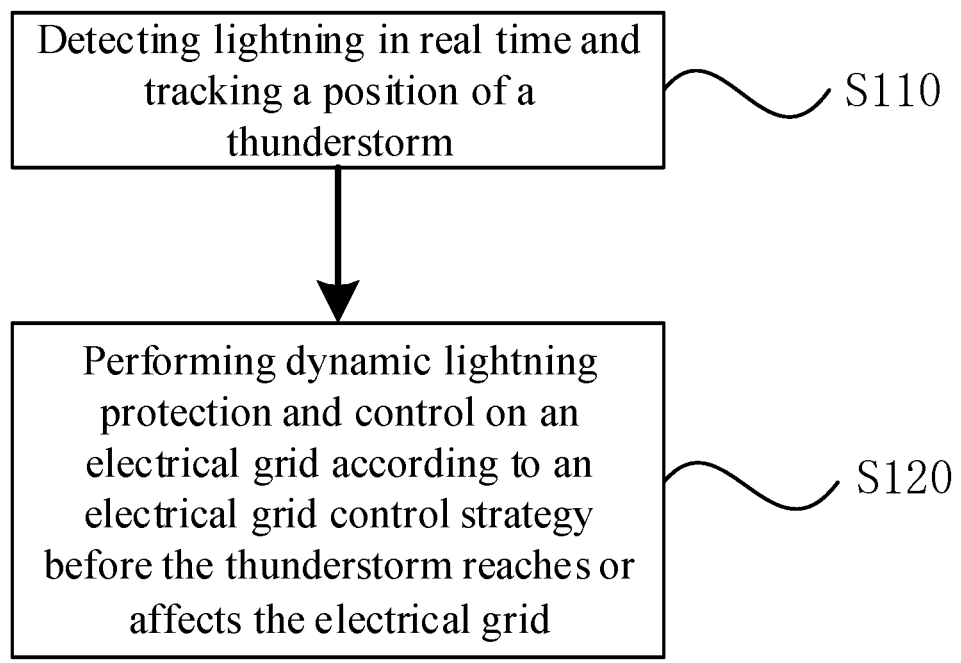
FIG. 1 is a flowchart of the present application.

As illustrated in FIG. 1, a dynamic lightning protection method is proposed including steps S110 and S120.

In step S110, lightning is detected in real time and a position of the thunderstorm is tracked.

A base lightning spatial radiation sensor network is used to acquire real-time lightning direction data. An atmospheric electric field strength meter is used to acquire real-time atmospheric electric field strength information. The position of the thunderstorm is tracked based on the preceding two data sources. Meanwhile, in order to make the influence to the power grid caused by the lightning clearer, the grid can be layered and partitioned, and the early-warning level of each part of the electrical grid is determined according to the position of the thunderstorm.

In one embodiment, when the position of the thunderstorm is tracked, the real-time lightning direction data acquired by the base lightning spatial radiation sensor network is data about thunderstorm that has not practical impact to the electrical grid. The target electrical grid system is an electrical grid system that requires dynamic lightning protection. For example, if the target electrical grid is a provincial electrical grid system, it is necessary to detect lightning in the entire provincial electrical grid and the certain surrounding area, and track lightning direction data of this area. If the target electrical grid is a municipal electrical grid system, it is necessary to detect lightning activities in this municipal electrical grid and the certain surrounding area and track lightning direction data of this area. Similarly, the real-time atmospheric electric field strength information acquired by the atmospheric electric field strength meter is also related to the target electrical grid system. Based on the detected lightning direction data and the acquired atmospheric electric field strength information, tracking the position of the thunderstorm around the target electrical grid system is realized.

In one embodiment, the electrical grid system may be partitioned and an early-warning level of each partition of the electrical grid is determined according to the position of the thunderstorm. In another way, the electrical grid can be layered and the early-warning level of each layer of the electrical grid will be determined respectively, according to the position of the thunderstorm after the layering, and subsequently different control strategies can be used in different layers. For example, if the target electrical grid is a regional electrical grid, it can be divided into power transmission network level and power distribution network level. In different layers, different early-warning levels are determined, and different control strategies may be adopted to achieve dynamic lightning protection, so as to ensure security and stability of the operation of the electrical grid system.

The same electrical grid in different operating states may have different consequences after being struck by lightning. After the early-warning levels of different partitions or layers of the electrical grid are determined according to the tracked position of the thunderstorm, the operating states of the entire electrical grid system are adjusted and coordinated according to the determination results of the early-warning levels. Then, the probability of power failure caused by lightning stroke occurring in areas of the entire electrical grid can be reduced or the power failure caused by lightning stroke can be avoided, thereby achieving overall lightning protection of the target electrical grid system.

It should be illustrated that it is feasible to partition or layer the electrical grid system to achieve dynamic lightning protection or to perform overall dynamic lightning protection for the target electrical grid system according to the size or range of the electrical grid without partitioning or layering.

In step S120, dynamic lightning protection and control is performed for the electrical grid according to an electrical grid control strategy before the thunderstorm reaches or affects the electrical grid.

Before dynamic lightning protection and control is performed for the electrical grid, the stability of the electrical grid is judged for the electrical grid control strategy according to the wide-area state estimation and the stability boundary calculation. Only on the premise that the electrical grid is stable, the electrical grid will be controlled according to the electrical grid control strategy.

That is, in response to adopting each of the control strategies, the stability of the electrical grid needs to be ensured. Before one or more electrical grid control strategies for the dynamic lightning protection are actually implemented, the stability of the power grid after adjustment should be estimated according to electrical grid stability constraint verification rules, which is based on the wide-area state estimation and stability boundary calculation. If stable, the control is implemented, and if not, another strategy is used or no strategy is implemented.

The electrical grid control strategy includes at least one of the following.

Strategy one is to optimize an operation mode of the electrical grid, so as to change the power flow path of the electrical grid and to prevent the power flows of the electrical grid from passing through a lightning-threatened area.

The operation mode of the electrical grid refers to the real-time topological structure which is determined by the practical positions of the switches and disconnectors during operation. By controlling and switching of a series of switches and disconnectors, the dynamic topological structure of the electrical grid may be changed, and meanwhile, the directions and paths of the power flows as well as the basic circuit structure of the electrical grid may also be changed.

Figure 2:
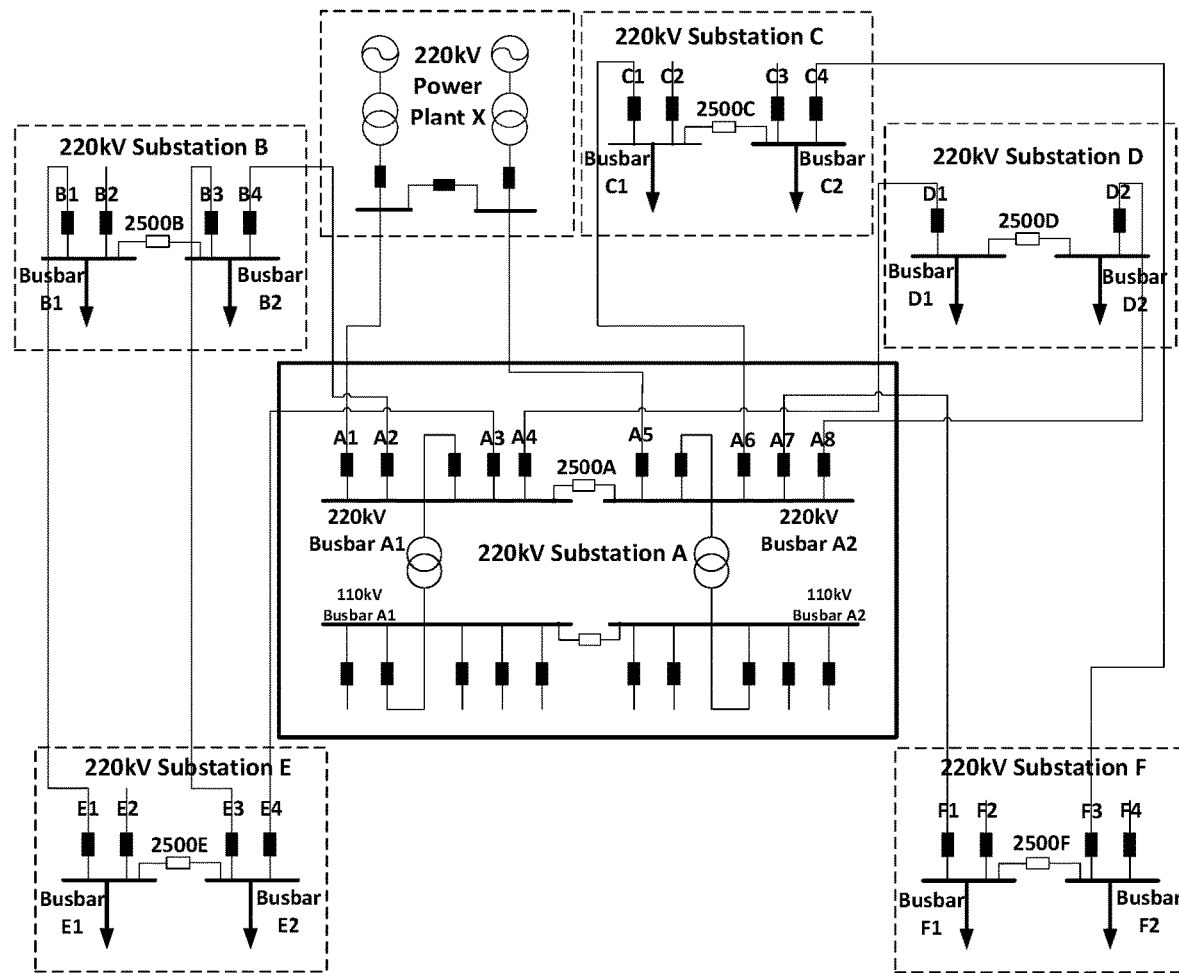
FIG. 2 is a topological structure of an electrical grid.

As illustrated in FIG. 2, by switching on and off of each bus coupler switch (2500A, 2500B, 2500C, 2500D, 2500E, 2500F) and each line switch (A1-A8, B1-B4, C1-C4, D1-D2, E1-E4, F1-F4), a looped network or several branch networks can be formed respectively. Alternatively, a looped network operation mode or a terminal operation mode may be formed. For example, by closing the switch 2500A of the substation A, the switch 2500B of the substation B, the switch 2500C of the substation C, the switch 2500E of the substation E and the switch 2500F of the substation F, and meanwhile opening the switch B3 of the substation B, a looped network including two generators (power plant X) and ten busbars is formed. At this time, the substation C is in the looped network operation mode and the substation D is in the terminal operation mode/feed operation mode.

Figure 3:
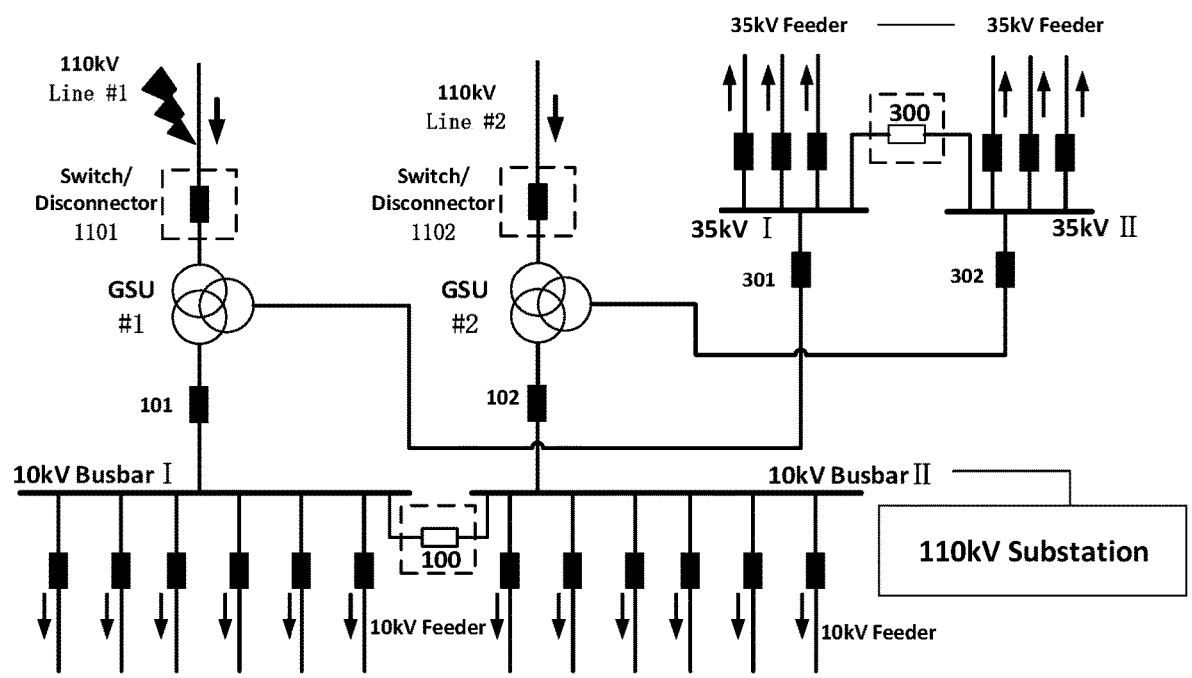
FIG. 3 is a topological structure of a substation.

As illustrated in FIG. 3, a 110 kV substation is adjusted as follows: (1) The power supply mode of a part of 10 kV distribution lines on the 10 kV busbar of the 110 kV substation in the figure is changed from an original external power supply mode of power output to a reverse power supply mode of power input. That is, the operation mode of a part of the low-voltage side lines is changed from an outgoing line operation mode to an incoming line operation mode. This operation may be implemented by the distribution network scheduling center according to the specific network wiring mode by switching on and off of the switches on the distribution lines, and switching of load switches of the distribution network, and thereby changing the input or output operation modes of the 10 kV lines. (2) The load at the end of the distribution network is generally supplied by two power sources which come from 10 kV lines of two different substations. In FIG. 3, it is feasible to connect the 10 kV distribution line switches of the substation on the opposite side and then disconnect the 10 kV distribution line switches on the 10 kV busbar of the current substation to achieve power switching of the load, namely to transfer the load. (3) In the case where the power distribution network has at least one microgrid including distributed power sources, it is feasible to adjust the control strategy of the microgrid so as to increase or decrease the output of the microgrid connection point or so as to switch grid-connection/island operation mode of the microgrid, namely to switch the control strategy of the microgrid at the end of the low voltage and the output of the distributed power sources to change the power flow direction or load distribution of the power distribution network.

Strategy two is to adjust the power flows of the electrical grid to reduce the power flows on the power transmission path in the lightning-threatened area and to increase the power flows on the power transmission path in a safe area.

Figure 4:
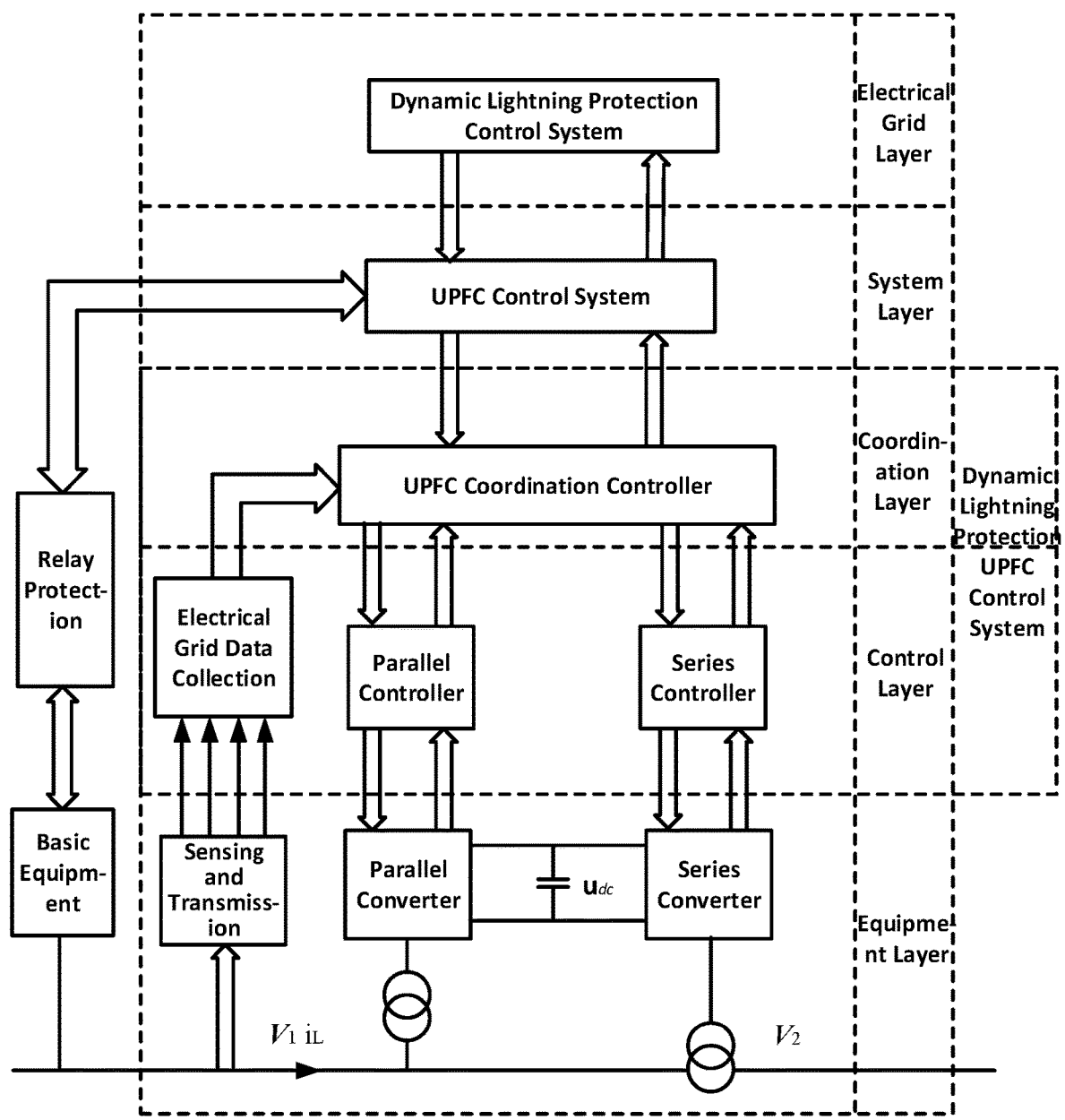
FIG. 4 is a structure diagram of a modified multi-UPFC.
Figure 5:
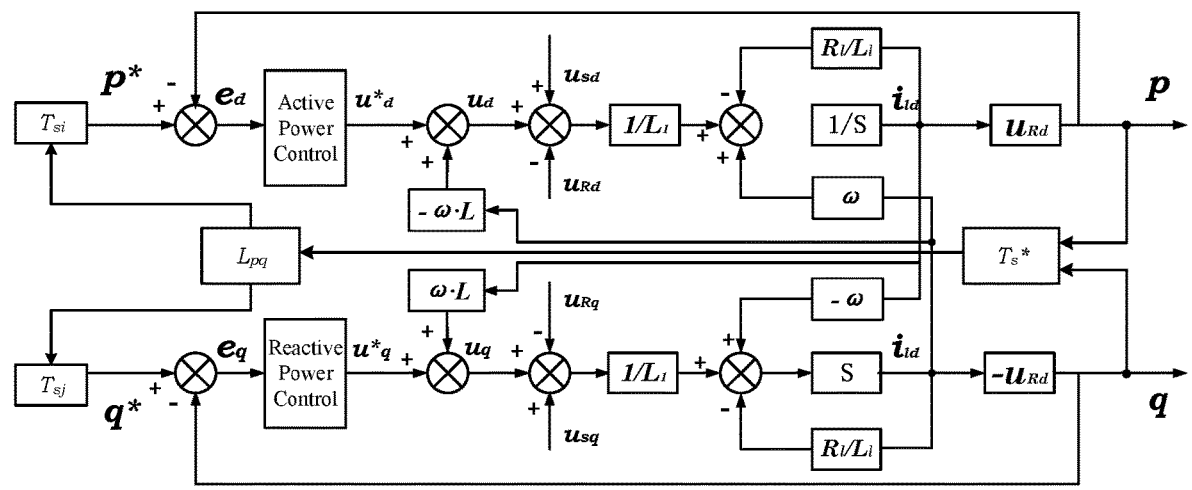
FIG. 5 is a control principle of a modified multi-UPFC.

Typically, the power flows of the electrical grid may be adjusted using the Unified Power Flow Controller (UPFC). FIG. 4 shows the structure diagram of the modified multi-UPFC. The modified multi-UPFC consists of the following parts: (1) the equipment layer, which includes a series converter, a paralleled converter, a series transformer and a paralleled transformer; (2) the control layer, which includes a series controller and a paralleled controller configured to ensure that the input and output of the converter can meet the pre-output requirement; (3) the coordination layer, which is configured to implement feedback calculation to meet the compensation function; (4) the system layer, which is configured to achieve the coordination function and the unified control of the control equipment to make it possible to match the electrical grid scheduling strategy; and (5) the electrical grid layer, which is configured to perform global optimal control of the power flows of the electrical grid. FIG. 5 shows the basic control principle. The bottom-layer (equipment-layer, control-layer and coordination-layer) control principle is consistent with the common UPFC control principle. The system-layer control combines stability constraint parameters for dynamic lightning protection of a single UPFC system on the basis of the bottom-layer control. The electrical-grid-layer control combines overall coordinated control strategies based on the system-layer control, that is, the electrical-grid-layer control coordinates with control strategies such as operation mode optimization and nonlinear control.

Strategy three is to non-linearly control the generator/power generation unit and dynamically control the power source to control power flow output of the electrical grid and to increase power output in the safe area.

The nonlinear control of the generator/power generation unit is to read the real-time state quantity and feedback parameters of the generator/power generation unit to obtain stability constraint parameters and optimal control parameters of the electrical grid, thereby achieving overall coordinated control of the generator/power generation unit by the upper-layer control of the power generation control system.

The power transmission network and the power distribution network in the electrical grid system have different types of generators or power generation units. For example, for a conventional generator of the power plant in the power transmission network, the output of the generator may be adjusted by a manual or an automatic control strategy of the power scheduling center. For a microgrid including distributed power sources in the power distribution network, it is feasible to adjust the input and output of the microgrid by adjusting the control strategy of the microgrid controller.

Figure 6:
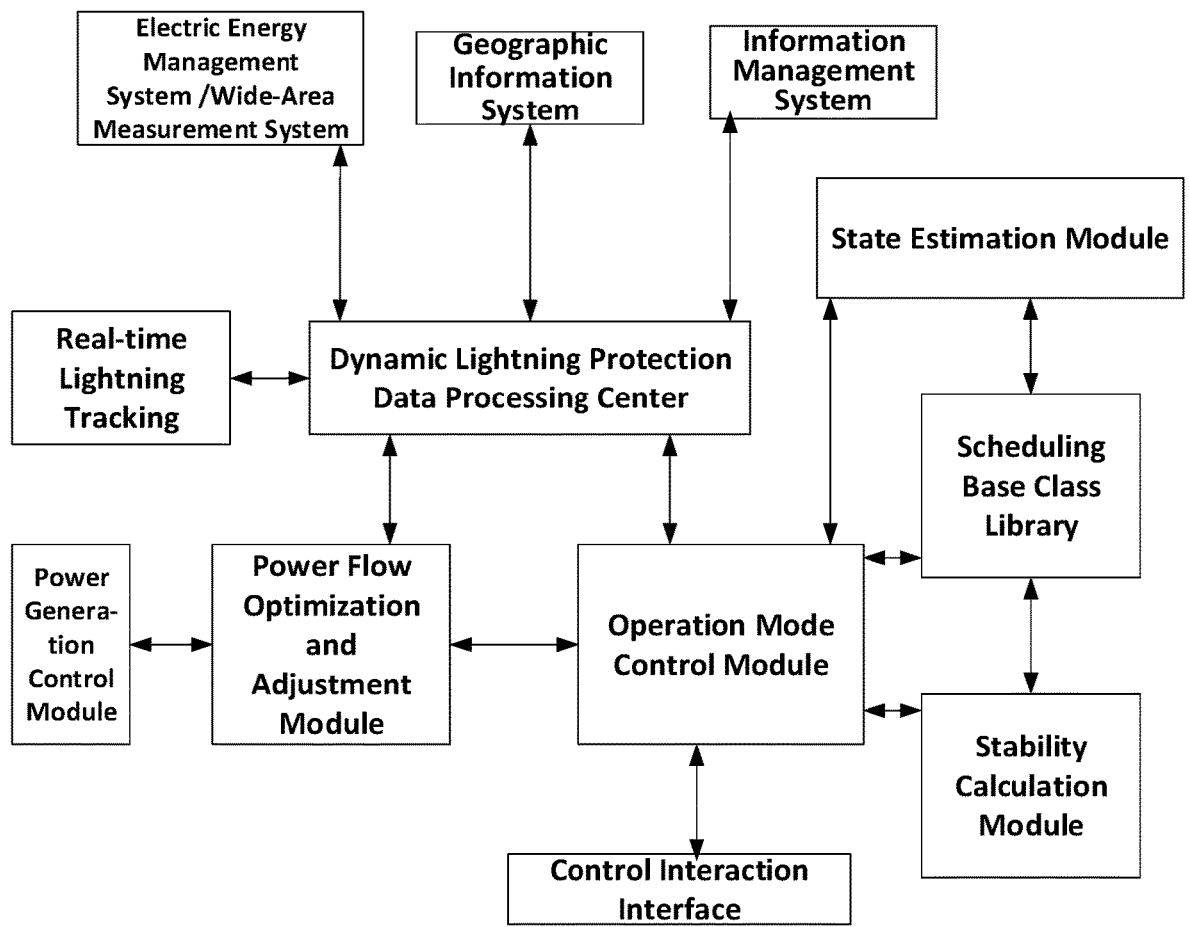
FIG. 6 is a block diagram of a system.

As illustrated in FIG. 6, a dynamic lightning protection system includes a real-time lightning tracking unit, a data processing center, an operation mode control module, a power flow optimization and adjustment module, a generator/power generation unit nonlinear control module, a scheduling base class library, a state estimation module and a stability calculation module is proposed.

These modules serve the following functions.

The real-time lightning tracking unit is configured to track a position of a thunderstorm according to real-time lightning direction data and atmospheric electric field strength information.

The data processing center is configured to acquire real-time lightning tracking information from the real-time lightning tracking unit, to acquire equipment lightning protection performance information, equipment status and defect information from the Management Information System (MIS) of the electrical grid, to acquire geographic distribution information of the electrical grid from the geographic information system, and to acquire operation mode information of the electrical grid, real-time load information and power flow distribution information of the electrical grid from the electric energy management system/wide-area measurement system. All information which serves as a basic data element will then be inputted into each module. Meanwhile, the data processing center receives feedback information of each module and transmits the feedback information to corresponding modules.

The operation mode control module is configured to control the electrical grid according to a strategy one: optimizing the operation mode of the electrical grid to change the power flow path of the electrical grid and to prevent the power flows of the electrical grid from passing through the lightning-threatened area.

The power flow optimization and adjustment module is configured to control the electrical grid according to a strategy two: adjusting the power flows of the electrical grid to reduce the power flows on the power transmission path in the lightning-threatened area and increase the power flows on the power transmission path in a safe area.

The generator/power generation unit nonlinear control module is configured to control the electrical grid according to a strategy three: non-linearly controlling the generator/power generation unit and dynamically controlling the power source to control power flow output of the electrical grid and to increase power output in the safe area.

The scheduling base class library is configured to store electrical grid stability constraint verification rules.

The state estimation module is configured to perform a wide-area state estimation for the electrical grid after the electrical grid is controlled according to the electrical grid control strategy, and determine whether the controlled electrical grid is stable according to the electrical grid stability constraint verification rules.

The stability calculation module is configured to perform a stability boundary calculation for the electrical grid after the electrical grid is controlled according to the electrical grid control strategy, and determine according to the electrical grid stability constraint verification rules whether the controlled electrical grid is stable.

In one embodiment, the dynamic lightning protection system further includes an electrical grid partitioning and early-warning module. The electrical grid partitioning and early-warning module is configured to: partition the electrical grid and determine the early-warning level of each partition of the electrical grid respectively after the partitioning according to the position of the thunderstorm. The dynamic lightning protection system further includes an electrical grid layering and early-warning module configured to: layer the electrical grid and determine according to the position of the thunderstorm an early-warning level of each layer of the electrical grid respectively after the layering.

The overall idea of the traditional lightning protection mode of the electrical grid is equivalent to blocking, namely to strengthen the insulation strength and install a variety of lightning protection equipment for each device. The idea of the preceding method and system is equivalent to dredging, namely to divert, optimize and balance the load of the electrical network. Therefore, the basic idea of dynamic lightning protection is to dynamically control the electrical grid based on real-time detection and tracking of lightning, and stability calculation and intelligent decision-making. In response to lightning threatening a certain power line or a certain part of the electrical grid, the load of this part should be transferred, so that the load distribution of the entire electrical grid is optimized and balanced. In response to the lightning threat being removed, the operation mode is switched back to the original economical operation mode from the safe operation mode.

Table 1 shows a comparison between the preceding method and the traditional lightning protection method.

TABLE 1

Comparison Table

| | Conventional Lightning Protection Mode | Dynamic Lightning Protection Mode |
|---|---|---|
| Method | Ensuring the normal operation of the entire electrical grid by protecting each single equipment/part of the system | Ensuring the normal operation of the entire electrical grid system by maintaining real-time dynamic balance of the electrical grid system |
| Principle | Introducing the destructive energy of lightning into the earth; increasing the insulation strength | Optimizing the operation mode of the electrical grid; adjusting the power flows of the electrical grid; non-linearly controlling the generator/power generation unit |
| Focus | Design and installation phase | Real-time operation phase |
| Target | Single equipment, component or facility, such as line, transformer, electronic equipment, entire substation, etc. | Protecting the entire electrical grid as a dynamically balanced whole |
| Measure | Fixed measures, such as overhead ground wires, lightning rods, lightning arresters, insulation strength enhancement, Surge Protection Devices (SPD), etc. | Dynamic measures based on real-time lightning data |
| Purpose | Ensuring safe and stable operation of the entire electrical grid system including the smart electrical grids | |

The preceding method proposes a "dynamic lightning protection" method on the system level for the electrical grid according to the dynamic balance nature of the electrical grid and by use of the control mechanism of "dredging rather than blocking". This method combines real-time lightning tracking and electrical grid stability calculation. Before the thunderstorm reaches or affects the electrical grid system, this method optimizes the operation mode of the electrical grid system, or adjusts the power flow of the electrical grid or non-linearly controls the generator/power generation unit according to one or more control strategies to achieve dynamic lightning protection. The present application can improve the lightning protection performance of the smart electrical grid, increase the stability of the system in lightning weather, reduce electrical grid accidents caused by lightning and greatly reduce power outage losses.

What is claimed is:

1. A dynamic lightning protection method, comprising:
   detecting lightning in real time and tracking a position of a thunderstorm; and
   performing dynamic lightning protection and control on an electrical grid according to an electrical grid control strategy before the thunderstorm reaches or affects the electrical grid;
   wherein the electrical grid control strategy comprises at least one of the following:
   optimizing an operation mode of the electrical grid to change a power flow path of the electrical grid to prevent power flows of the electrical grid from passing through a lightning-threatened area;
   adjusting power flows of the electrical grid to reduce power flows on a power transmission path in the lightning-threatened area and increase power flows on a power transmission path in a safe area; or
   non-linearly controlling a generator/power generation unit and dynamically controlling a power source to control a power flow output of the electrical grid and increase a power output in the safe area.

2. The dynamic lightning protection method of claim 1, further comprising: before performing the dynamic lightning protection and control on the electrical grid, determining a stability of the electrical grid for the electrical grid control strategy.

3. The dynamic lightning protection method of claim 2, wherein the determining the stability of the electrical grid for the electrical grid control strategy comprises:
  determining through a wide-area state estimation and a stability boundary calculation whether the electrical grid is stable after the electrical grid is controlled according to the electrical grid control strategy; and in response to determining that the electrical grid is stable after it is controlled according to the electrical grid control strategy, controlling the electrical grid according to the electrical grid control strategy.

4. The dynamic lightning protection method of claim 1, wherein the detecting lightning in real time and tracking a position of a thunderstorm comprises:
  tracking the position of the thunderstorm according to acquired real-time lightning direction data and atmospheric electric field strength information.

5. The dynamic lightning protection method of claim 1, further comprising:
  partitioning the electrical grid and determining, according to the position of the thunderstorm, an early-warning level of each partition of the electrical grid respectively after the partitioning;
  or layering the electrical grid and determining, according to the position of the thunderstorm, an early-warning level of each layer of the electrical grid respectively after the layering.

6. A dynamic lightning protection system, comprising:
  a real-time lightning tracking unit, a data processing center, a processor and a memory for storing instructions executable by the processor;
  wherein
  the real-time lightning tracking unit is configured to track a position of a thunderstorm according to real-time lightning direction data and atmospheric electric field strength information;
  the data processing center is configured to: acquire real-time lightning tracking information from the real-time lightning tracking unit, to acquire geographic distribution information of an electrical grid from a geographic information system, and to acquire operation mode information of the electrical grid, power flow distribution information and real-time load information of the electrical grid from an electric energy management system/wide-area measurement system; input all information which serves as a basic data element into the processor; and receive feedback information from the processor, and transmit the feedback information to the processor;
  the processor is configured to:
  optimize an operation mode of the electrical grid before the thunderstorm reaches or affects the electrical grid to change a power flow path of the electrical grid to prevent power flows of the electrical grid from passing through a lightning-threatened area;
  adjust power flows of the electrical grid before the thunderstorm reaches or affects the electrical grid to reduce power flows on a power transmission path in the lightning-threatened area and increase power flows on a power transmission path in a safe area; and
  non-linearly control a generator/power generation unit and dynamically control a power source before the thunderstorm reaches or affects the electrical grid to control a power flow output of the electrical grid and increase a power output in the safe area.

7. The dynamic lightning protection system of claim 6, wherein
  the memory is further configured to store electrical grid stability constraint verification rules;
  the processor is further configured to:
  perform a wide-area state estimation on the electrical grid after the electrical grid is controlled according to an electrical grid control strategy, and determine whether the controlled electrical grid is stable according to the electrical grid stability constraint verification rules; and
  perform a stability boundary calculation for the electrical grid after the electrical grid is controlled according to the electrical grid control strategy, and determine whether the controlled electrical grid is stable according to the electrical grid stability constraint verification rules.

8. The dynamic lightning protection system of claim 6, wherein the data processing center is further configured to acquire equipment lightning protection performance information, and equipment status and defect information from a Management Information System (MIS) of the electrical grid.

9. The dynamic lightning protection system of claim 6, wherein the processor is further configured to: partition the electrical grid and determine, according to the position of the thunderstorm, an early-warning level of each partition of the electrical grid respectively after the partitioning.

10. A non-transitory computer-readable storage medium, storing a computer program that is configured to be executed by a processor to perform a dynamic lightning protection method, the dynamic lightning protection method comprising:
  detecting lightning in real time and tracking a position of a thunderstorm; and
  performing dynamic lightning protection and control on an electrical grid according to an electrical grid control strategy before the thunderstorm reaches or affects the electrical grid;
  wherein the electrical grid control strategy comprises at least one of the following:
  optimizing an operation mode of the electrical grid to change a power flow path of the electrical grid to prevent power flows of the electrical grid from passing through a lightning-threatened area;
  adjusting power flows of the electrical grid to reduce power flows on a power transmission path in the lightning-threatened area and increase power flows on a power transmission path in a safe area; or
  non-linearly controlling a generator/power generation unit and dynamically controlling a power source to control a power flow output of the electrical grid and increase a power output in the safe area.

11. The non-transitory computer-readable storage medium of claim 10, wherein the dynamic lightning protection method further comprises: before performing the dynamic lightning protection and control on the electrical grid, determining a stability of the electrical grid for the electrical grid control strategy.

12. The non-transitory computer-readable storage medium of claim 11, wherein the operation of determining the stability of the electrical grid for the electrical grid control strategy comprises: determining through a wide-area state estimation and a stability boundary calculation whether the electrical grid is stable after the electrical grid is controlled according to the electrical grid control strategy; and in response to determining that the controlled electrical grid is stable, controlling the electrical grid according to the electrical grid control strategy.

13. The non-transitory computer-readable storage medium of claim 10, wherein the operation of detecting lightning in real time and tracking a position of a thunderstorm comprises:
   tracking the position of the thunderstorm according to acquired real-time lightning direction data and atmospheric electric field strength information.

14. The non-transitory computer-readable storage medium of claim 10, wherein the dynamic lightning protection method further comprises:
   partitioning the electrical grid and determining, according to the position of the thunderstorm, an early-warning level of each partition of the electrical grid respectively after the partitioning;
   or layering the electrical grid and determining, according to the position of the thunderstorm, an early-warning level of each layer of the electrical grid respectively after the layering.

15. The dynamic lightning protection system of claim 6, wherein the processor is further configured to: layer the electrical grid and determine, according to the position of the thunderstorm, an early-warning level of each layer of the electrical grid respectively after the layering.

* * * * *